United States Patent [19]

Naitoh

[11] 4,261,531
[45] Apr. 14, 1981

[54] SEAT BELT RETRACTOR HAVING BELT TAKE-UP FORCE LOCKING MEANS

[75] Inventor: Katsumi Naitoh, Fujisawa, Japan

[73] Assignee: NSK-Warner K. K., Tokyo, Japan

[21] Appl. No.: 37,290

[22] Filed: May 9, 1979

[30] Foreign Application Priority Data

| Jul. 4, 1978 | [JP] | Japan | 53-91402[U] |
| Jul. 20, 1978 | [JP] | Japan | 53-98847[U] |
| Nov. 8, 1978 | [JP] | Japan | 53-152700[U] |
| Feb. 28, 1979 | [JP] | Japan | 54-24091[U] |

[51] Int. Cl.³ .................. A62B 35/00; B65H 75/48
[52] U.S. Cl. .................. 242/107.6; 280/807; 297/475; 180/270
[58] Field of Search ... 242/107.6, 107.7, 107.4 R–107.4 E; 280/801, 806–808; 297/475–478, 483; 180/268–270

[56] References Cited

U.S. PATENT DOCUMENTS

| 4,002,311 | 1/1977 | Fisher et al. | 242/107.7 |
| 4,103,845 | 8/1978 | Ueda | 242/107.7 |
| 4,172,568 | 10/1979 | Yamanashi et al. | 242/107.6 |
| 4,198,011 | 4/1980 | Kamijo et al. | 242/107.7 |
| 4,199,172 | 4/1980 | Fukunaga et al. | 242/107.6 X |

FOREIGN PATENT DOCUMENTS 2250282  5/1975  France .................. 297/475

*Primary Examiner*—John M. Jillions
*Attorney, Agent, or Firm*—Shapiro and Shapiro

[57] ABSTRACT

A seat belt retractor comprising belt take-up shaft means supported by the base member, belt take-up force locking means capable of assuming an interlocked position in which it is interlocked with the take-up shaft means and a non-interlocked position in which it is not interlocked with the take-up shaft means, and sensing means for bringing the take-up force locking means to the interlocked position and the non-interlocked position, respectively, in accordance with the wearing and removal of the seat belt of a belt wearer.

The take-up force locking means in the interlocked position prevents the take-up of the belt so far drawn out but permits draw out and take-up of the belt in a predetermined range beyond the amount so far drawn out.

8 Claims, 25 Drawing Figures

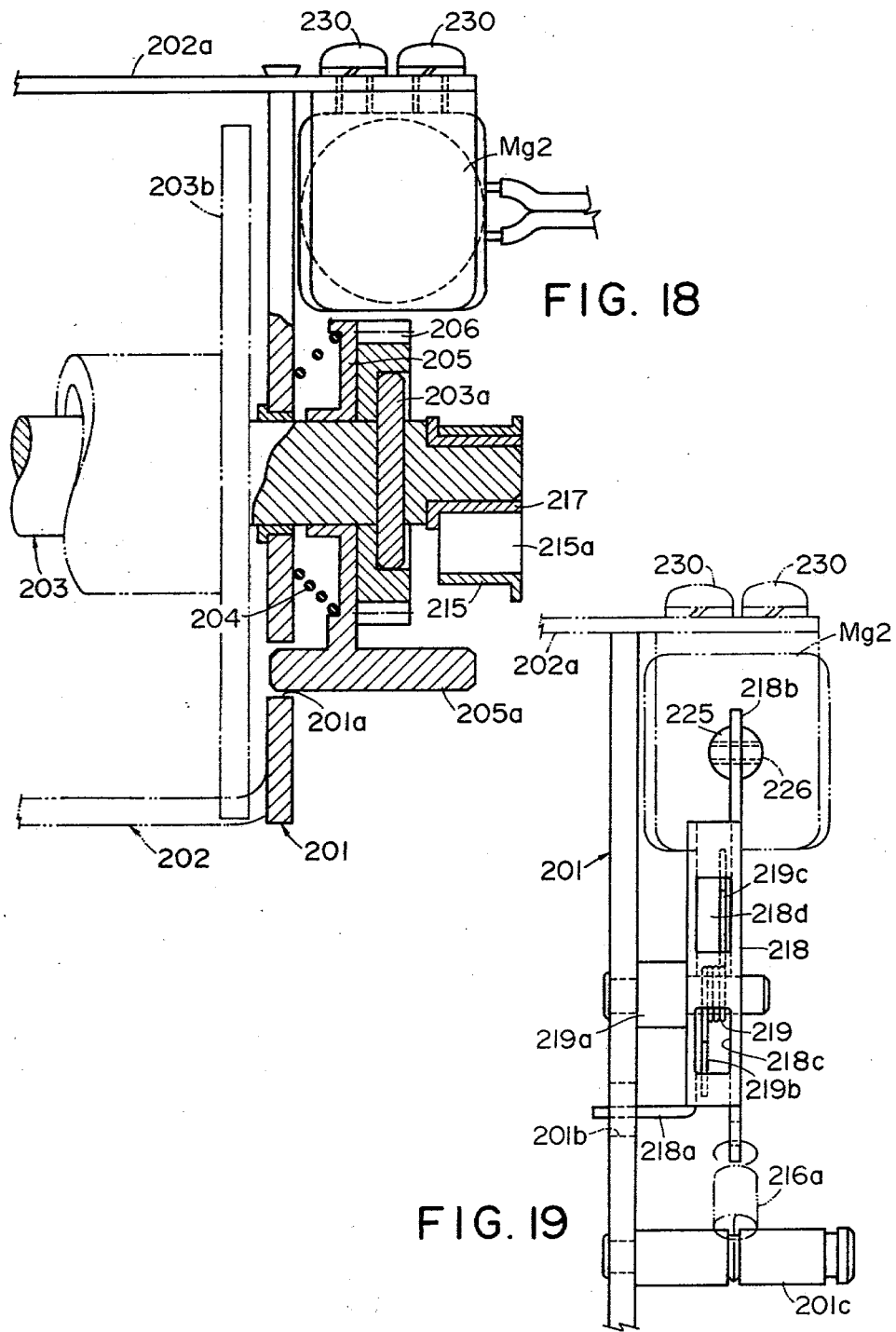

SEAT BELT RETRACTOR HAVING BELT TAKE-UP FORCE LOCKING MEANS

BACKGROUND OF THE INVENTION

1. Field of the Invention

This invention relates to a retractor for automatically taking up the seat belt of a vehicle, and more specifically to improvements in a retractor provided with belt take-up force locking means.

2. Description of the Prior Art

To eliminate the belt take-up force of a retractor exerted on a belt wearer during the wearing of the seat belt and realize comfortable wearing of the seat belt, a retractor has been proposed which is provided with take-up force locking means for locking the belt take-up force during the normal use of the seat belt drawn out from the retractor and for preventing uncomfortable sense of restraint from being imparted to the belt wearer.

However, the retractor provided with such locking means still suffers from problems. One of the problems is that when the seat belt is further drawn out by movement of the belt wearer during the wearing of the belt, the locking means acts in that drawn out condition of the belt to create a slack in the seat belt, which thus cannot achieve its original function as the seat belt. Another problem is that the locking means, which is normally operated by means for sensing the wearing of the seat belt of the belt wearer and bringing the locking means into operative condition by the sensing signal, almost always acts before the belt wearer assumes his final or normal seated position, and often creates a slack in the seat belt, which thus may not perform its original function as the seat belt.

SUMMARY OF THE INVENTION

It is therefore a first object of the present invention to provide a retractor having take-up force locking means which permits draw-out and take-up of the seat belt from the belt wearing position in a predetermined range necessary for the behaviour of the belt wearer and which nulls the belt take-up force exerted on the belt in the belt wearing position.

It is a second object of the present invention to provide a retractor having take-up force locking means for restraining the belt wearer in a condition in which a suitable slack is present in the belt.

Other objects, features and benefits of the present invention will become apparent from the following detailed description taken in conjunction with the accompanying drawings.

BRIEF DESCRIPTION OF THE DRAWINGS

FIG. 18 is a cross-sectional view taken along line G—G in FIG. 16.

FIG. 19 is a view taken along line H—H in the direction of arrows.

DESCRIPTION OF THE PREFERRED EMBODIMENTS

Embodiments of the present invention will hereinafter be described.

Figure 1:
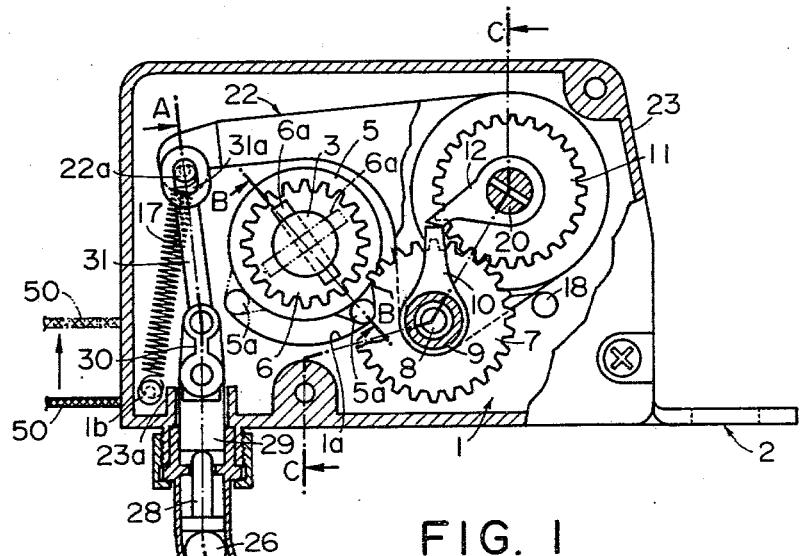
FIG. 1 is a front view of essential portions of a first embodiment of the present invention.
Figure 2:
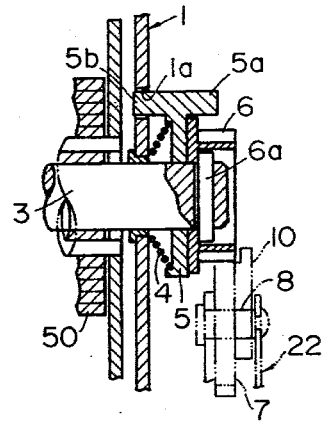
FIG. 2 is a cross-sectional view taken along line B—B in FIG. 1.
Figure 3:
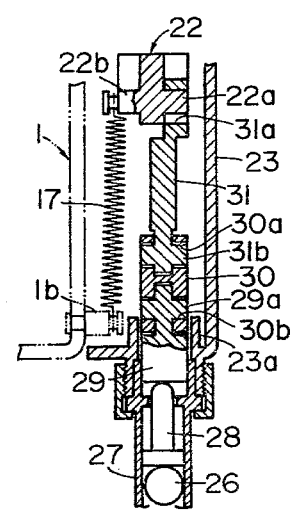
FIG. 3 is a cross-sectional view taken along line A—A in FIG. 1.
Figure 4:
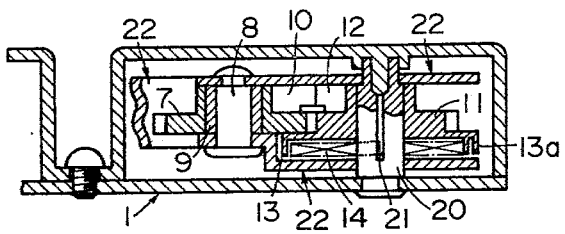
FIG. 4 is a cross-sectional view taken along line C—C in FIG. 1.

FIG. 1 is a front view of essential portions of a first embodiment of the present invention, and FIGS. 2, 3 and 4 are cross-sectional views taken along line B—B, line A—A and line C—C, respectively, in FIG. 1. Designated by 1 is one side plate of the frame of a retractor, and another side plate, not shown, lies in opposed relationship with the side plate 1. A base portion 2 extends between the opposite side plates. A take-up shaft 3 is rotatably supported between the two side plates. The take-up shaft 3 is biased in a belt take-up direction, namely, in counter-clockwise direction, as viewed in FIG. 1, by a take-up spring provided on said another side plate. Designated by 50 is a belt. Before the belt is worn, much of the belt 50 is taken up on the take-up shaft 3 and extends out as indicated by solid line in FIG. 1 from a point relatively greatly spaced apart radially from the take-up shaft 3, but it extends out as indicated by dot-and-dash line in FIG. 1 as it is drawn out.

A gear 6 is mounted on one end of the take-up shaft 3 for rotation with the shaft 3 by means of a pin 6a passed through said one end, and a disc 5 is mounted on the take-up shaft 3 between the gear 6 and the side plate 1 and urged against the back side of the gear 6 by a spring 4 (see FIG. 2). The disc 5 has two projections 5a and 5b at a location on the outer periphery thereof, the projections being projected outwardly and inwardly, respectively, from the front and back surfaces, respectively of the disc, and the inward projection 5b extends into an arcuate groove 1a formed in the side plate 1 and having a predetermined center angle. Thus, the disc 5 is rotatable with the gear 6 due to the friction force between the disc and the gear 6, but the range of rotation thereof is limited by the opposite end walls of the arcuate groove 1a into which the inward projection 5b of the disc 5 extends.

Designated by 7 is an idle gear movable between a position in which it meshes with the gear 6 and a position in which it does not mesh with the gear 6. This gear 7 is rotatably mounted, through a collar 9, on a shaft 8 secured to a shifter 22 rockable about a rotary shaft 20 secured to the side plate 1 (see FIG. 4). A cam portion 10 extending radially and rotatable about the shaft 8 with the idle gear 7 is formed integrally with the idle gear 7. A stop gear 11 meshing with the idle gear 7 is also mounted on the rotary shaft 20 on which the shifter 22 is supported. A cam portion 12 extending radially and rotatable with the stop gear 11 is also formed integrally with the gear 11. This cam portion 12 is engageable with the aforementioned cam portion 10 at two locations to mutually prevent rotations in predetermined directions. The side of the stop gear 11 which is adjacent to the side plate 1 provides a box portion 13 housing therein a return spring 14 having the inner end thereof secured in the slit 21 of the rotary shaft 20 and the outer end thereof secured to the outer peripheral wall 13a of the box portion 13. The return spring 14 gives a counter-clockwise bias to the stop gear 11 as viewed in FIG. 1, and accordingly, when the mesh engagement between the idle gear 7 and the gear 3 is released, the idle gear 7 and the stop gear 11 are returned to assume a first mutually restrained position shown in FIG. 1 in which the two cam portions 10 and 12 are engaged to restrain each other, whereupon the gears 7 and 11 become stationary.

The portion of the shifter 22 through which the shaft 8 and the rotary shaft 20 pass, as shown in FIG. 4, are formed into two layers between which the gears 7 and 11 are housed. At the end of the portion of one layer of the shifter 22 which extends leftwardly in FIG. 1, there are formed two upwardly and downwardly projected projections 22a and 22b, and a shifter return spring 17 is stretched between the downward projection 22b and a mounting portion 1b projected from the side plate 1, and a crank arm 31, to be described, is engaged with the upward projection 22a. Accordingly, the shifter 22 is biased for counter-clockwise rotation about the rotary shaft 20 as viewed in FIG. 1, and the counter-clockwise rotation of the shifter 22 by such counter-clockwise biasing force is limited by a stop 18 projected from the side plate 1.

Incidentally, as shown in FIG. 2, the face width of the gear 6 is relatively great and the idle gear 7 is designed to mesh with the gear at the upper portion thereof. This prevents the upward projection 5a of the disc 5 from contacting the idle gear 7 to hamper the rotational movement of the disc 5.

Particular reference is now had to FIGS. 1 to 3 to describe the latching and unlatching motions of the buckle apparatus of the safety seat belt system and the mechanism by which the state of the shifter 22 is changed by slightly pulling the belt worn by the belt wearer to bring the gear 3 and the idle gear 7 into or out of meshing engagement.

Designated by 31 is the crank arm having an elliptical hole 31a at one end thereof and having a pin portion 31b at the other end thereof, and the upward projection 22a at the end of the shifter 22 is loosely fitted in the elliptical hole 31a. The pin portion 31b of the crank arm 31 is fitted in one circular hole 30a of a joint arm 30 having opposed circular holes 30a and 30b formed at the opposite ends thereof formed as two layers, and forms a turning pair. On the other hand, a pin portion 29a is formed on that end of a rod arm 29 which is inside a cover 23, the rod arm being housed for reciprocal linear movement within a cylindrical portion 23a formed in the side wall of the cover 23, and this pin portion 29a is fitted in the other circular hole 30b of the aforementioned joint arm 30, and also forms a turning pair. A flexible tube 27 containing therein a row of steel balls 26 densely disposal lengthwise of the tube is connected to the cylindrical portion 23a of the cover 23, and a rod 28 which is in contact with the leading steel ball 26 and the rod arm 29 and slidable lengthwise in the tube 27 is provided between that leading steel ball 26 and the bottom end face of the rod arm 29.

Figure 8:
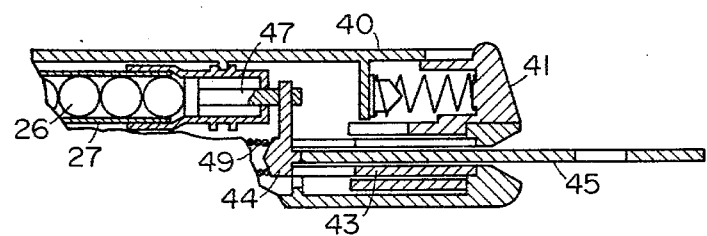
FIG. 8 is a cross-sectional view of a portion of an actual example of the buckle apparatus provided with sensing means.

The force-out of the steel balls 26 is effected upon the belt being fastened in the buckle apparatus around the belt wearer. An example of the sensing means thereof is shown in FIG. 8. FIG. 8 shows the forward portion of the buckle apparatus, and reference character 40 denotes a cover, reference character 41 denotes a push button biased forwardly of the buckle apparatus, and reference character 43 designates a base member by which a latch member or the like for meshing with a tongue member 45 is supported. In this buckle apparatus, there is a coil spring 49 incorporated in the base member 43 to cause the tongue 45 to jump out upon disengagement thereof. Thus, the tongue 45 is inserted to backwardly slide a slider 44 biased by the coil spring 49, whereby a rod 47 integrally coupled to the slider 44 is also forced rearwardly and when the slider 44 is returned forwardly by the coil spring 49 upon disengagement, the rod 47 may also slide forwardly therewith.

Operation of the present embodiment constructed as described above will now be described.

Figure 5:
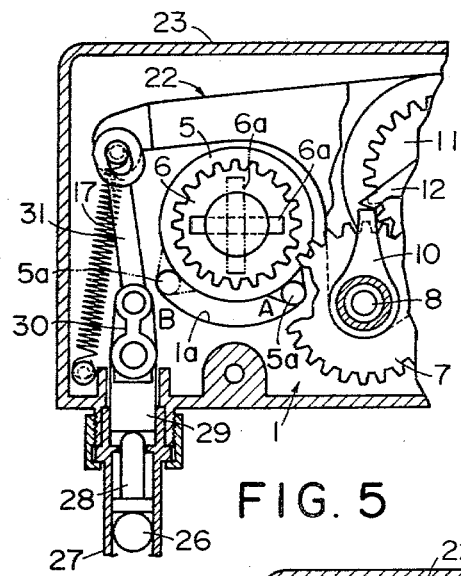
FIGS. 5 to 7 illustrate the operation of the first embodiment.

Belt take-up force locking means remains in the position of FIG. 5 until the buckle apparatus of the safety seat belt system latches the tongue, only the take-up shaft 3 and the gear 6 rotating by protraction or draw-out of the seat belt. Also, in this case, the disc 5 remains in a position wherein the inward projection 5b thereof is restrained at a point B in the arcuate groove 1a, and frictionally contacts the rotating gear 6 at its surface of contact therewith.

Figure 6:
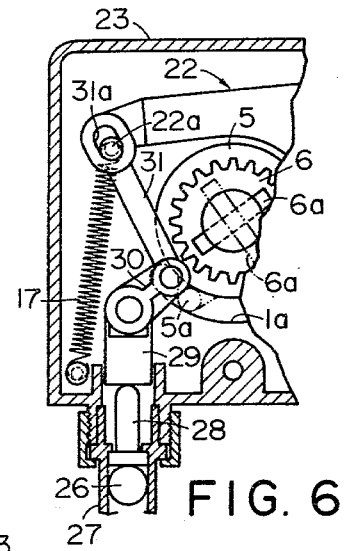

Here, if the buckle apparatus is latched when a suitable length of the belt has been drawn out, by fastening tongue 45 therein, the steel balls 26 are raised and the rod 28 is also raised. Therewith, the rod arm 29 is slid upwardly as viewed in FIG. 5, while the joint arm 30 and the crank arm 31 are not raised but are bent in dog-legged shape as shown in FIG. 6 because of the downward biasing force of the spring. Accordingly, the shifter 22 remains in the position of FIG. 5. During the insertion of the tongue 45 into the buckle apparatus, various rotational states of the disc 5 are possible, but upon completion of the insertion of the tongue 45, the disc 5 is rotated counter-clockwise with the gear 6 to bring the upward projection 5b into a position wherein it is restrained at a point A in the arcuate groove 1a, as the belt is retracted slightly, when, for example, the belt wearer moves from a belt fastening position in which he is leaning forward to a normally seated position where he leans against the back of the seat. Until then, the locking means is not operative and belt take-up force is exerted on the seat belt.

Figure 7:
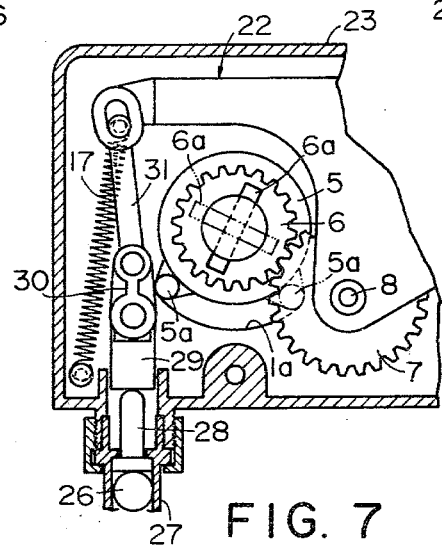

Subsequent to the insertion of the tongue 45 into the buckle apparatus and the belt attaining a position corresponding to the belt wearer being normally seated, as the belt is protracted, the disc is rotated clockwise with the gear 6. When the belt has been protracted to a predetermined position, the node between the joint arm 30 and the crank arm 31, which has been bent in a dog-legged shape, is kicked by the upward projection 5a of the disc 5. As the result, the three arms 29, 30 and 31 become straight to raise the shifter 22. Thus, the gear 6 meshes with the idle gear 7 as shown in FIG. 7. In this state, the take-up shaft 3 is prevented from retracting the belt, becaused the idle gear 7 tends to rotate clockwise but such clockwise rotation of the idle gear 7 is prevented by the mutual engagement between the two cam portions 10 and 12. Therefore, the force of the belt take-up spring is not exerted on the belt wearer and thus, the belt wearer is free of a sense of oppression. However, it is possible within a certain range to draw out the belt in FIG. 7, because the gear 6 tends to be rotated clockwise by the draw-out of the belt and accordingly the idle gear 7 tends to rotate counter-clockwise, which rotation of the idle gear 7 in such direction is in no way prevented by the two cam portions 10 and 12. Thus, the belt can be drawn out and taken up within a certain range from its worn position. To what extent the belt can be drawn out may be variously designed, and an embodiment therefor will now be described. In the present embodiment, the number of teeth of the gear 6 is twenty, that of the idle gear 7 is twenty-six, and that of the stop gear 11 is twenty-five. Consequently, the gear ratio between the gear 6 and the idle gear 7 is 26:20. On the other hand, the number of revolutions made by the idle gear 7 from when the idle gear 7 and the stop gear 11 respectively rotate counter-clockwise and clockwise from their position of FIG. 1 until the two cam portions 10 and 12 assume another mutually restrained position in which they are approximately symmetrical with their position of FIG. 1 with respect to the center line passing through the centers of rotation of the idle gear and the stop gear is about 24. Therefore, draw-out of the belt is possible until the gear 6 makes about $24 \times 26/20 \cong -$ revolutions clockwisely in FIG. 7.

The upward projection 5a of the disc 5 moves from the point A to the point B in the arcuate groove 1a when the belt is slightly drawn out or when the belt is drawn out with the movement of the belt wearer while the locking means is operating, but the upward projection 5a returns to the point A and settles down there.

Lastly, description will be made of the operation during the disengagement of the buckle apparatus. When the buckle disengagement occurs in the state of FIG. 7, the steel balls 26 lower and simultaneously therewith, the rod 28, the rod arm 29, the joint arm 30 and the crank arm 31 lower together, which causes the shifter 22 to rotate counter-clockwise. Thus, the position of FIG. 5 is again brought about, waiting for the next wearing of the belt.

In the present embodiment, an involuntary behavior of the belt wearer may also bring about operative condition of the locking means even if the belt wearer does not consciously draw out the belt after the engagement of the buckle apparatus.

In the first embodiment described above, the steel balls for transmitting the buckle latch signal may be replaced by push-pull wire, liquid or gas.

Figure 9:
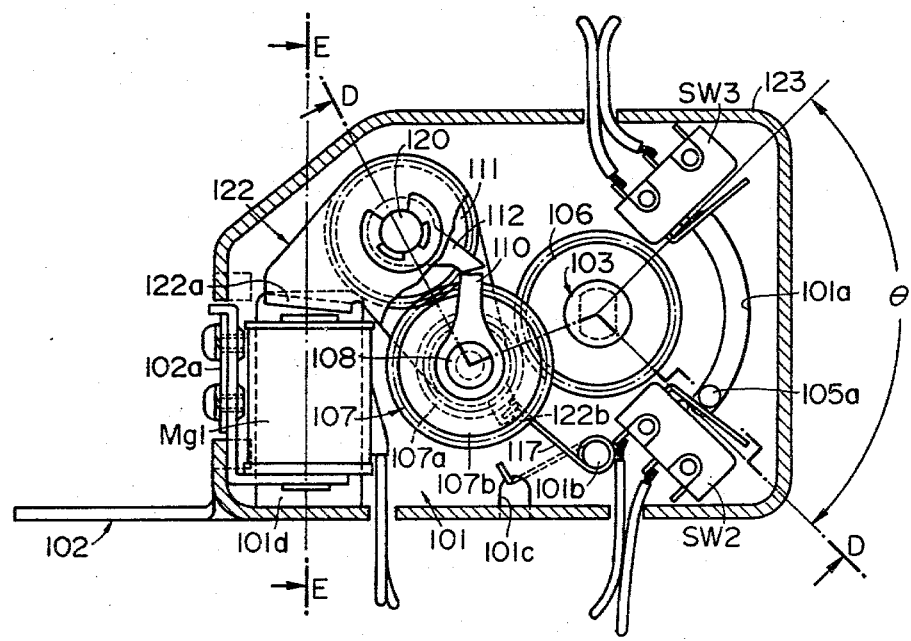
FIG. 9 is a front view of essential portions of a second embodiment of the present invention.
Figure 10:
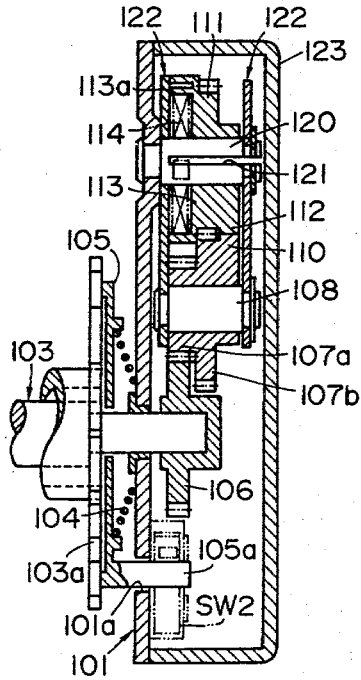
FIG. 10 is a cross-sectional view taken along line D—D in FIG. 9.
Figure 11:
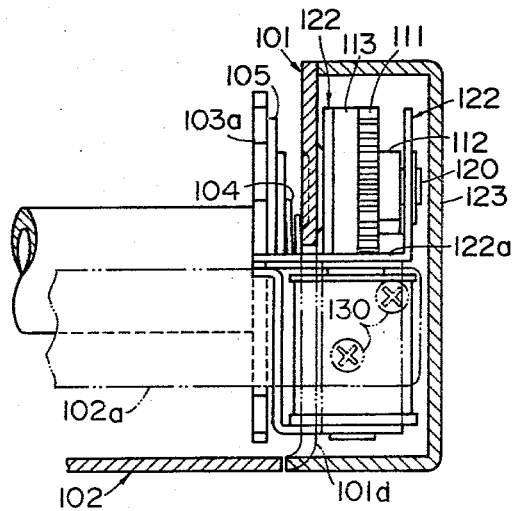
FIG. 11 is a cross-sectional view taken along line E—E in FIG. 9.

A second embodiment of the present invention will now be described. FIG. 9 is a front view of essential portions of the second embodiment of the present invention, and FIG. 10 and 11 are cross-sectional views taken along line D—D and line E—E, respectively, in FIG. 9. Designated by 101 is one side plate portion of the base member of a retractor, and another side plate portion, not shown, lies in opposed relationship with the side plate portion 101. A base portion 102 extends between the opposite side plate portions. A take-up shaft 103 is rotatably supported between the two side plate portions. The take-up shaft 103 is biased in a belt take-up direction, namely, in clockwise direction, as viewed in FIG. 9, by a take-up spring provided on said another side plate portion.

A main gear 106 is mounted on one end of the take-up shaft 103 for rotation with the shaft 103, and a disc 105 is mounted on the take-up shaft 103 between a ratchet wheel 103a integral with the shaft 103 and forming a part of an emergency locking mechanism for the retractor and the inner side of the side plate portion 101, the disc 105 being urged against the outer side of the ratchet wheel 103a with a suitable force by a spring 104 (see FIG. 10). The disk 105 has a projection 105a in the outer peripheral portion thereof, and this projection extends outwardly through an arcuate groove 101a having a predetermined center angle $\theta$ (see FIG. 9) formed in the side plate portion 101. Thus, the disc 105 tends to rotate with the shaft 103 due to its friction force with the ratchet wheel 103a, but the range of such rotation is limited by the predetermined center angle $\theta$ of the arcuate groove 101a. By the disk 105 being provided inside the side plate portion 101, a cover 123 for covering the mechanism on the side plate portion may be relatively low in height.

Designated by 107 is an idle gear movable between a position in which it meshes with the main gear 106 and a position in which it does not mesh with the main gear. The gear 107 has a pinion gear portion 107a for meshing with the main gear 106 and a large gear portion 107b meshing with a stop gear 111, and is rotatably mounted on a shaft 108 secured to a shifter 122 rockable about a rotary shaft 120 secured to the side plate portion 101. A cam portion 10 extending radially is integrally formed with the idle gear 7. By earning the radius of the main gear 106 by providing the pinion gear portion 107a on the idle gear 107, the torque imparted from the gear 106 to the gear 107 during meshing engagement between these gears 106 and 107 is reduced to ensure the positive meshing engagement.

The stop gear 111 meshing with the gear 107 is also rotatably mounted on the shaft 120. A cam portion 112 extending radially is also integrally formed with the stop gear 111. This cam portion 112, as in the first embodiment, is engageable with the aforementioned cam portion at two locations to mutually prevent rotations in predetermined directions.

That side of the stop gear 111 which is adjacent to the side plate portion is formed as a box portion 113 in which a return spring 114 has its inner end secured to the split 121 of the shaft 120 and its outer end secured to the slit of the outer peripheral wall 113a of the box portion 113. The return spring 114, as in the first embodiment, imparts clockwise bias to the stop gear 111, as viewed in FIG. 9.

The aforementioned shifter 122 may preferably be formed of a metal so as to be rigid and is formed into two layers as shown in FIGS. 10 and 11, and the gears 107 and 111 are contained between these two layers. A cut-away 122b is formed at the tip end of the rightwardly and downwardly extending portion of the lower layer of the shifter 122, as viewed in FIG. 9, and one end of a shifter return spring 117 is hooked to such cut-away. The shifter return spring 117 which is a torsion spring has its circular portion contained in a circular hole 101b in the side plate portion 101 and the other end of the shifter return spring extends along the back side of the side plate portion 101, with the tip end thereof hooked to a cut-away 101c formed in the side plate portion 101. Thus, the shifter 122 is biased clockwisely by the return spring 117, as viewed in FIG. 9. Since the shifter return spring 117 is a torsion spring as mentioned above, the space occupied by it may be small.

Description will now be made of the latching and unlatching motions of the buckle apparatus of the seat belt system, means for sensing the normal seated position of the belt wearer and the operation of the belt being somewhat drawn out by the normally seated belt wearer, and drive means for operating the shifter 122 in accordance with the signal from such sensing means.

Designated by Mg1 is a magnet assembly secured by a screw 130 to a bridge 102a extending between the two side plate portions and slightly fitted in a cut-away 101d formed in the side plate portion 101. Because of the magnet assembly Mg1 being so fitted, the height thereof is reduced to permit the use of a relatively low cover 123. When the magnet assembly is excited, it attracts the portion of the shifter 122 to rotate the shifter counterclockwise, as viewed in FIG. 9, against the force of the return spring 117.

Designated by SW2 is a microswitch for sensing the normal seated position of the belt wearer, and designated by SW3 is a microswitch for sensing the rotation of the belt take-up shaft 103 by a predetermined angle $\theta$ with some amount of the belt being drawn out. The amount of the angle $\theta$ may preferably be the amount of rotation of the take-up shaft 103 which will provide a slack of the belt corresponding to a clenched fist in the position in which the belt has been drawn out to the belt wearing state, and in the illustrated embodiment, it is approximately 90°.

Figure 12:
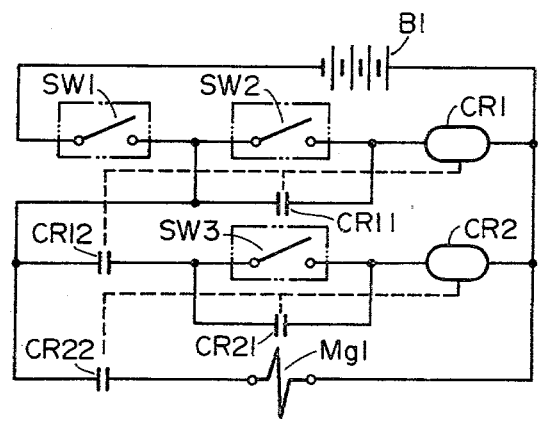
FIG. 12 is a circuit diagram of an electric circuit used in the second embodiment.
Figure 13:
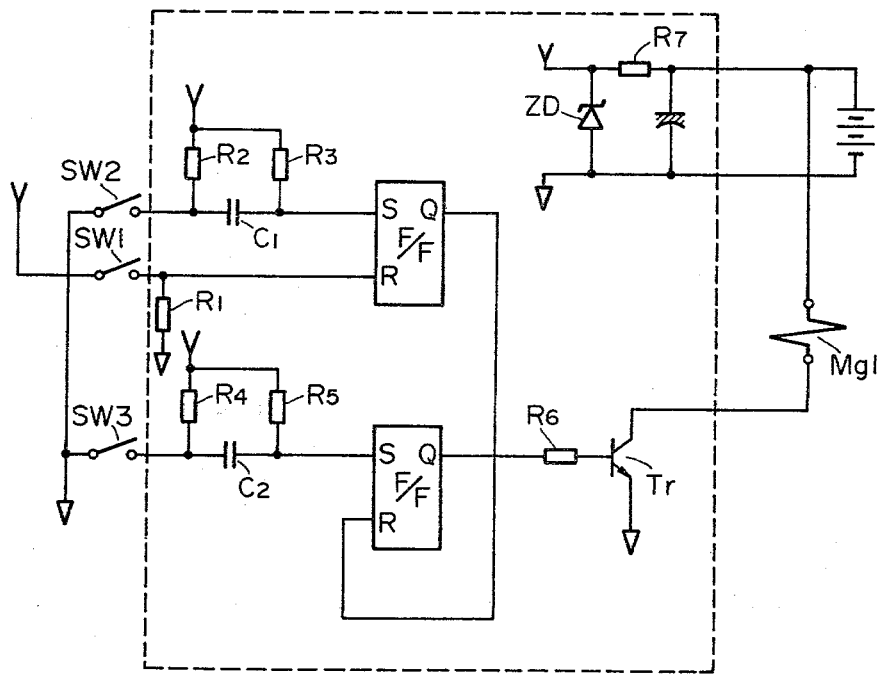
FIG. 13 is a circuit diagram of an electronic circuit for replacing the electric circuit of FIG. 12.

The magnet assembly Mg1, the microswitches SW2 and SW3, and a microswitch SW1 for sensing the latch of the buckle apparatus, not shown, together form an electrical circuit as shown in FIG. 12 or an electronic circuit as shown in FIG. 13 so that when the switch SW2 is closed after the closing of the buckle switch SW1 and thereafter, the switch SW3 is closed, the magnet assembly Mg1 is excited.

Figure 14:
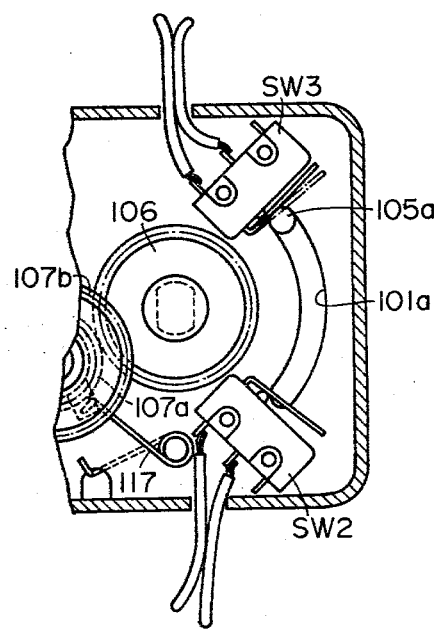
FIGS. 14 and 15 illustrate the operation of the second embodiment of FIG. 9.

The electrical circuit of FIG. 12 will first be described. When the belt take-up shaft 103 is rotated in a belt take-up direction by the belt wearer assuming the normal seated position after the buckle switch SW1 has been closed by latching the buckle apparatus, the projection 105a of the disc closes the switch SW2 (FIG. 9). Thereupon, the current from a battery B1 flows to a first relay CR1 to provide a conductive state and thus, two contacts CR11 and CR12 become connected. Therefore, when some amount of the belot is drawn out and the projection 105a of the disc closes the switch SW3 (FIG. 14), the second relay CR2 is energized, whereby two other contacts CR21 and CR22 become conncted. Thus, the magnet assembly Mg1 becomes excited. The first relay CR1, even if the switch SW2 is opened after the energization thereof, is maintained energized by the presence of a contact CR11 operated by the relay CR1 parallel-connected to this switch SW2, and also the second relay CR2, even if the switch SW3 is opened after the energization thereof, is maintained energized by the presence of a contact CR21 operated by the relay CR2. Thus, the buckle switch SW1 must be opened to deenergize the once excited magnet assembly Mg1.

The electronic circuit of FIG. 13 will now be described. The right-hand upper circuit portion of FIG. 13 in which a zener diode ZD is installed for supplying a stable voltage and the portions indicated as $\gamma$ and $\downarrow$ in this circuit portion are respectively connected to the portions indicated by similar symbols in the circuit in which flip-flop circuits are installed. The operation of this electronic circuit is the same as that of the above-described electrical circuit. When the switch SW2 is closed after the closing of the buckle switch SW1, the upper F/F circuit in FIG. 13 is set and, when the switch SW3 is closed thereafter, the lower F/F circuit in FIG. 13 is set to render a transistor Tr conductive and excite the magnet assembly Mg1. Again in this electronic circuit, once the F/F circuit is set, the F/F circuit is maintained set to excite the magnet assembly Mg1 continuously even if the switch SW2 and/or the switch SW3 is opened thereafter. Thus, the buckle switch SW1 must be opened to deenergize the magnet assembly Mg1. In FIG. 13, the portion encircled by a broken line may be formed as a printed plate.

Operation of the second embodiment constructed as described above will now be explained.

First, to latch the buckle apparatus of the seat belt system, the belt is drawn out from the retractor, and the buckle is latched while the belt is tensioned against the belt take-up force. At this time, the buckle switch SW1 is closed and the projection 105a of the disc is in the position of FIG. 14 to close the switch SW3. However, the magnet assembly Mg1 remains unexcited because the switch SW3 has not been closed after the closing of the switch SW2. Here, when the belt wearer assumes the normal seated position and leaves the belt to the action of the belt take-up force, the belt is again taken up until it oppresses the belt wearer. Accordingly, the projection 105a of the disc also comes to the position of FIG. 9 to close the switch SW2. When the belt is further drawn out from this position so as to create a slack corresponding to a clenched fist and the projection 105a of the disc is brought to the position of FIG. 14, the switch SW3 is closed to thereby excite the magnet assembly Mg1.

Figure 15:
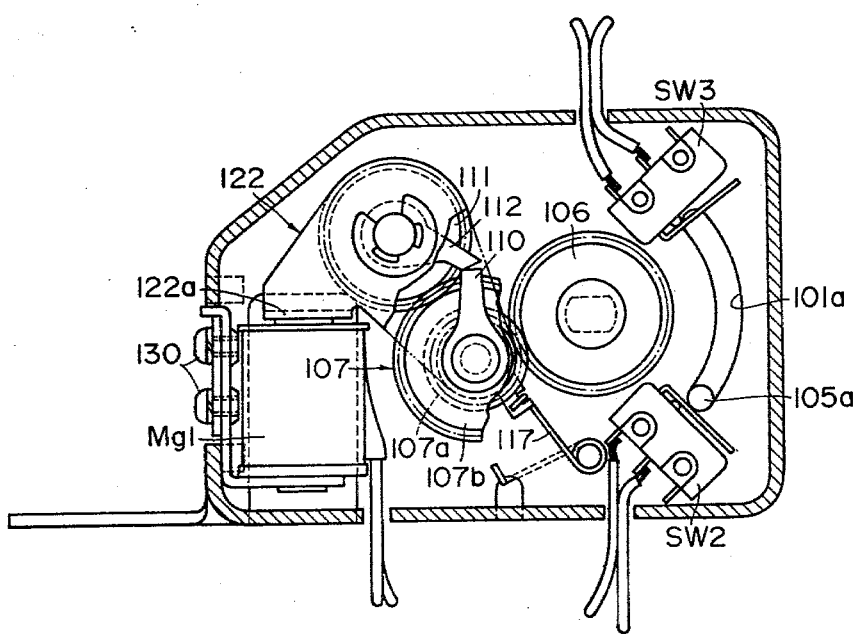

Thus, the meshing state of the idle gear 107 and the main gear 106 as shown in FIG. 15 is realized. Once the magnet assembly Mg1 is excited, the projection 105a of the disc may assume any position in the arcuate groove 101a.

Next, when the buckle is disengaged and the buckle switch SW1 is opened, the magnet assembly Mg1 becomes deenergized and the shifter 122 is returned to its original position by the shifter return spring 117, thus releasing the meshing engagement between the idle gear 107 and the main gear 106. At this time, even if the meshing engagement between the idle gear 107 and the main gear 106 is released with the belt drawn out from the above-described comfortable wearing position, the presence of the return spring 114 ensures the idle gear 107, the stop gear 111 and the two cam portions 110, 112 to be returned to their positions of FIG. 9 and become stationary in these positions.

A third embodiment of the present invention will now be described.

Figure 16:
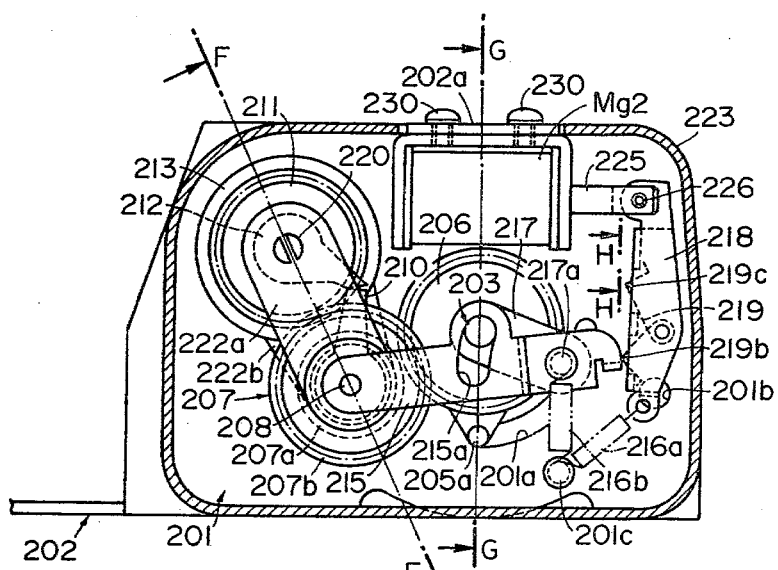
FIG. 16 is a front view of essential portions of a third embodiment of the present invention.
Figure 17:
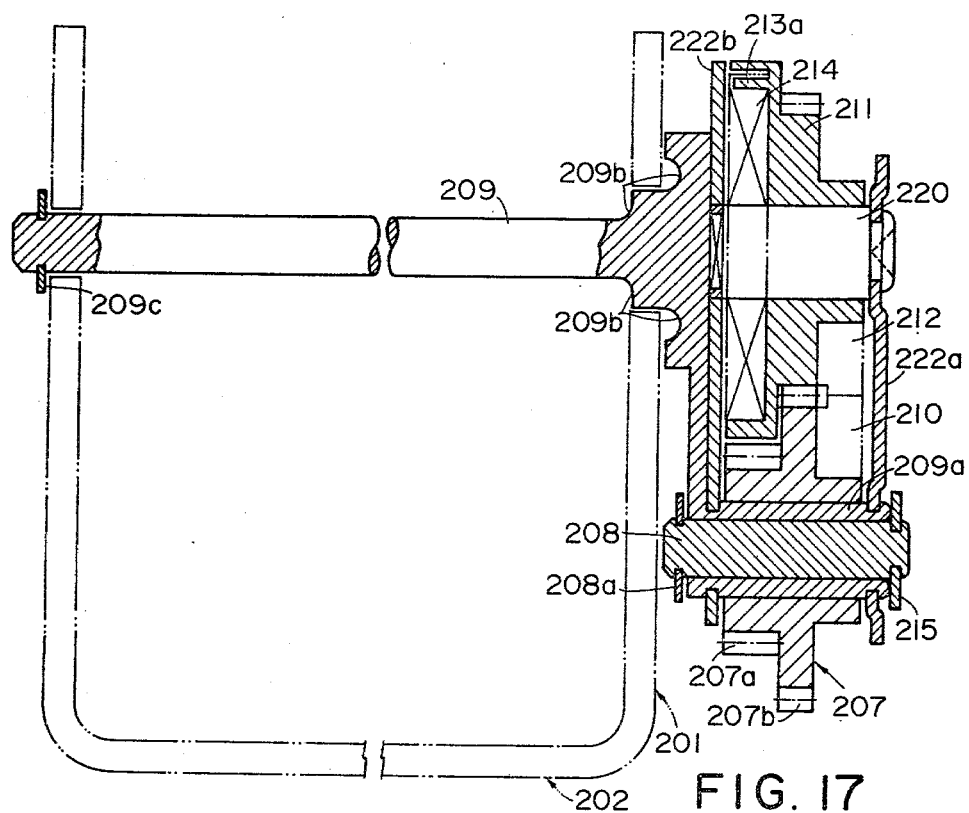
FIG. 17 is a cross-sectional view taken along line F—F in FIG. 16.

FIG. 16 is a front view of essential portions of the third embodiment. FIGS. 17, 18 and 19 are cross-sectional views taken along line F—F, line G—G and line H—H, respectively, in FIG. 16. Designated by 201 is one side plate portion of the base member of a retractor, and another side plate portion, not shown, lies in opposed relationship with the side plate portion 201. A base portion 202 extends between the opposite side plate portions. A take-up shaft means 203 is rotatably supported between the two side plate portions. The shaft means 203 is biased in a belt take-up direction, namely, in clockwise direction as viewed in FIG. 16, by a belt take-up spring provided on said another side plate portion.

In FIG. 18, a main gear 206 rotatable with the take-up shaft means 203 is mounted on one end of said shaft means 203, and a ratchet wheel 203b forming a part of the emergency locking mechanism of the retractor is secured to said one end of said shaft means. A disc 205 is rotatably mounted on the take-up shaft means 203 between the main gear 206 and the outer side of the side plate portion 201, the disc 205 being urged against the inner side of the main gear 206 with a suitable force by a spring 204. Designated by 203a is a key which may be a shear pin for preventing the gear from being broken down by the energy of the belt take-up spring when the belt is drawn out and abruptly returned after the tension lock. The disc 205 has a projection 205a on the outer peripheral portion thereof. The projection 205a comprises a downward projecting portion extending into an arcuate groove 201a formed in the side plate portion 201 and an upward projecting portion for kicking a lever 215 which will later be described. Accordingly, the disc 205 tends to be rotated with the shaft means 203 by the friction force with the main gear 206, but the range of such rotation is limited by the arcuate groove 201a.

In FIG. 17, reference numberal 207 designates an idle gear movable between a position in which it meshes with the main gear 206 and a position in which it does not mesh with the main gear. This gear 207 has a pinion gear portion 207a for meshing with the main gear 206, a large gear portion 207a meshing with a stop gear 211 to be described, and a radially extending first cam portion 210 rotatable with the gear 207, and is rotatably mounted on a cylindrical portion 209a which is integral with a resin mold shifter shaft 209 to be described which is rotatably supported between the side plate portions.

A stop gear 211 meshing with the larger gear portion 207b of the gear 207 is rotatably mounted on a shaft 220 integrally secured to the shifter shaft 209 and extending in the same direction as the shifter shaft 209. The stop gear 211, like the idle gear 207, is formed with a radially extending second cam portion 212 rotatable with the gear 211. The second cam portion 212 is engageable with the first cam portion at two locations to mutually prevent rotations in predetermined directions. In this respect, the third embodiment is the same as the first and second embodiments.

Designated by 222a and 222b are a clamping plate and a shifter base, respectively. The outer end of the cylindrical portion 209a of the shifter shaft 209 and the outer end of the shaft 220 are secured to the clamping plate 222a, and the above-mentioned cylindrical portion 209a and the shaft 209 extend through the shifter base 222b. The clamping plate 222a and the shifter base 222b are rotatable about the shifter shaft 209 and reinforce the shifter shaft 209 and make invariable the distance between the shifter shaft 220 and the cylindrical portion 209a. Rounded portions 209b formed on the shifter shaft 209 are for avoiding stress concentration, and a snap ring 209c at the other end of the shifter shaft 209 is for resisting the thrust load exerted on the shifter shaft 209.

That side of the stop gear 211 which is adjacent to the side plate portion is formed as a box portion 213 in which a return spring 214 is housed, and the return spring 214 is mounted in place with the inner end thereof secured to the shaft 220 and with the outer end thereof hooked to a slit in the outer peripheral wall 213a of the box portion 213. This return spring 214 imparts a clockwise biasing force to the stop gear 211 as viewed in FIG. 16 and thus, when the meshing engagement between the idle gear 207 and the main gear 206 is released, the gears 207 and 211 are returned to and become stationary at a point whereat the two cam portions 210 and 212 assume the first mutual rotation preventing position of FIG. 16.

Figure 24:
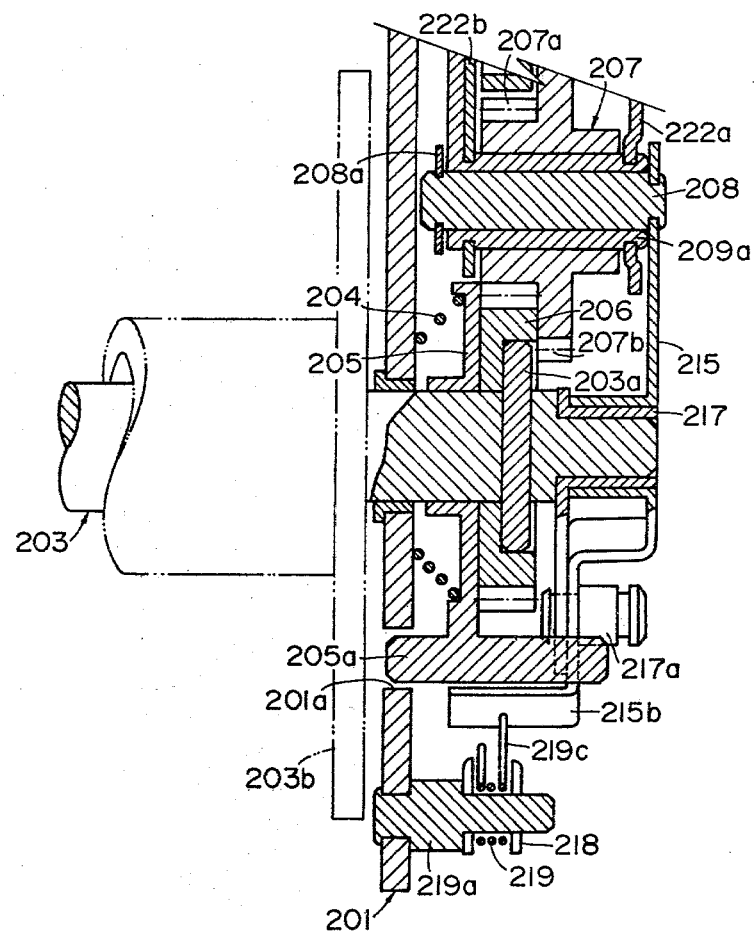
FIG. 24 is a cross-sectional view taken along line J—J in FIG. 23.

Designated by 215 is a lever having one end thereof clamped by the outer end of a pivot pin 208 which is rotatably and loosely mounted with the cylindrical portion 209a as the bearing. Denoted by 208a is a snap ring for preventing the pivot pin 208 from slipping out from the cylindrical portion 209a. In FIG. 18, the lever 215 has, in the intermediate portion thereof, an elongated slot 215a receiving therein the outer end of the shaft means 203, and the other end of the level 215 provides a downwardly bent portion 215b (see FIG. 24). Also, this lever 215 is rotatably connected by a link pin 217a to a link arm 217 which is rotatable about the outer end of the shaft means 203. The lever 215 and the link arm 217 are biased clockwise, as viewed in FIG. 16, by a coil spring 216 extending between and secured to the link pin 217a and a pin 201c studded in the side plate portion (see FIG. 16) and always try to assume the position of FIG. 16.

Designated by 218 in FIG. 19 is a trigger member mounted for pivotal movement about a pin 219a studded in the side plate portion. The trigger member 218 has a trigger hook spring 219 contained in the interior hollow thereof. One end of the trigger member 218 is coupled to the plunger 225 of a solenoid assembly Mg2, to be described, by a spring pin 226, and to the other end of the trigger member is hooked the other end of the coil spring 216a hooked to the aforementioned pin 201c. Thus, the trigger member 218 is biased clockwise as viewed in FIG. 16. By the downward bent portion 218a of the trigger member 218 extending into a hole 201b formed in the side plate portion, the rotational movement of the trigger member 218 is limited to a predetermined range. Incidentally, by a hook spring 219 having two lever hook portions 219b and 219c projected through the windows 218c and 218d of the trigger member 218 and by the opposite ends of the spring 219 being retained on the inner wall surface of the trigger member 218, the movement of the lever 215 is controlled in a manner which will hereinafter be described).

The solenoid assembly Mg2, to be described, is secured by a screw 230 to a bridge 202a extending between the opposite side plate portions and, when this solenoid assembly is energized, the plunger 225 is attracted, whereby the trigger member 218 is rotated counter-clockwise, as viewed in FIG. 16, against the spring force of a coil spring 216a.

In FIG. 16, reference numeral 223 denotes a cover for covering the members hitherto described.

Operation of the present embodiment constructed as described above will now be explained.

Figure 20:
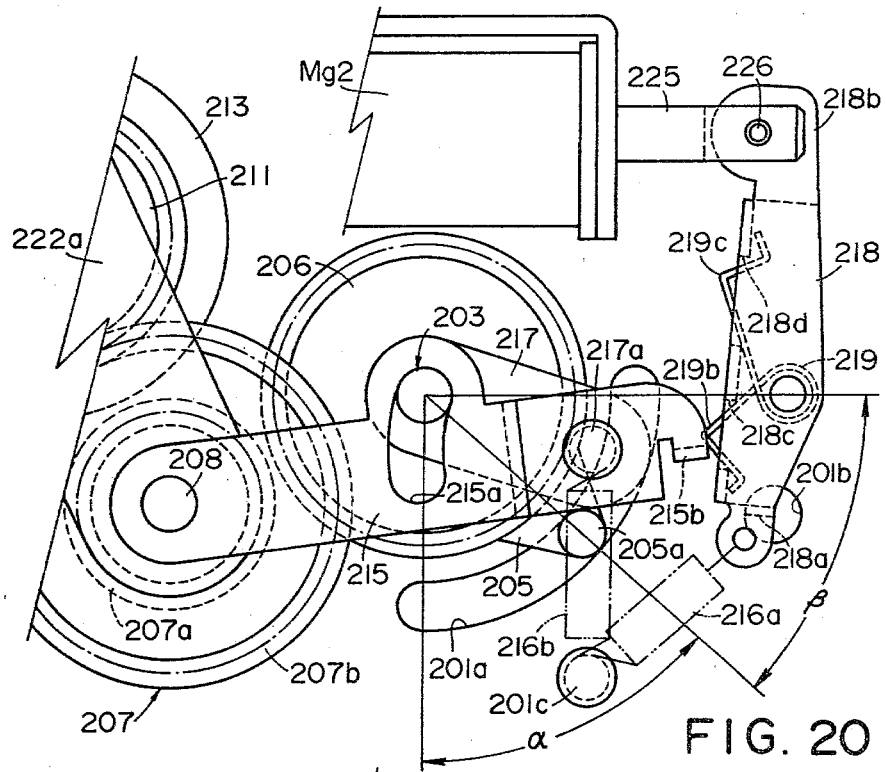
FIGS. 20 to 23 illustrate the operation of the third embodiment of FIG. 16.

When the belt is drawn out from the retractor by a person intending to wear the belt, the take-up shaft means 203 is rotated counter-clockwise in FIG. 20. The disc 205 is also rotated therewith, but it cannot be rotated from the position in which the projection 205a of the disc 205 strikes against the lever 215 which has been most rotated clockwise as shown in FIG. 20, and only the take-up shaft means 203 and the main gear 206 are rotated. That is, at a point of time whereat the tongue of the seat belt system is not yet latched, the solenoid assembly Mg2 is in non-excited condition and the plunger 225 is in its jutting-out position. Accordingly, the trigger member 218 is also in its clockwise rotated position and the down-ward bent portion 215b of the lever 215 engages the lever hook portion 219b of the hook spring 219, thereby preventing counter-clockwise rotation of the lever 215. Consequently, rotation of the disc 205 is prevented as described above. In this state, the main gear 206 and the idle gear 207 are out of meshing engagement and necessarily the belt take-up force locking means is not operative.

Figure 21:
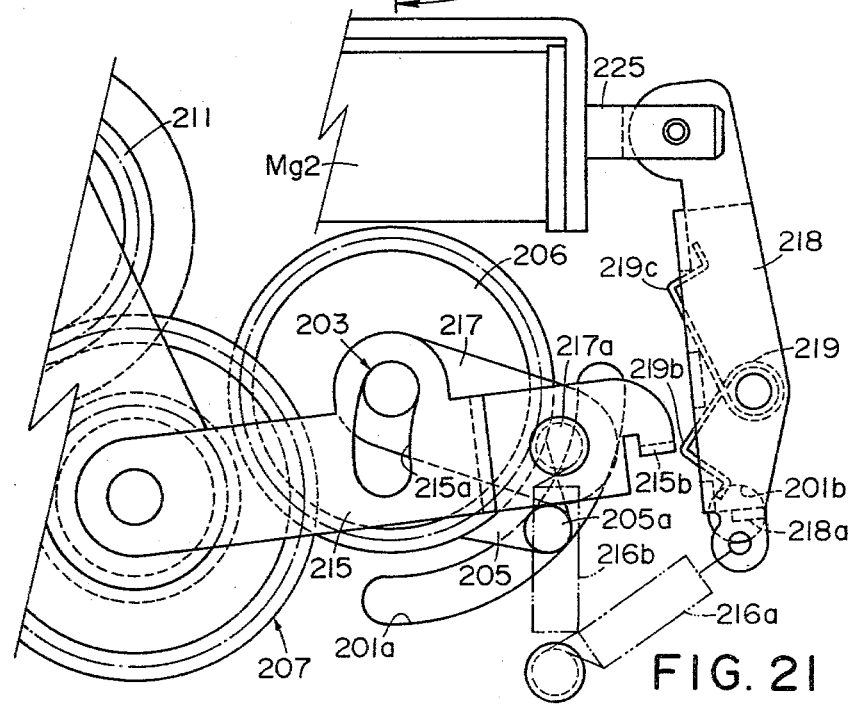
Figure 22:
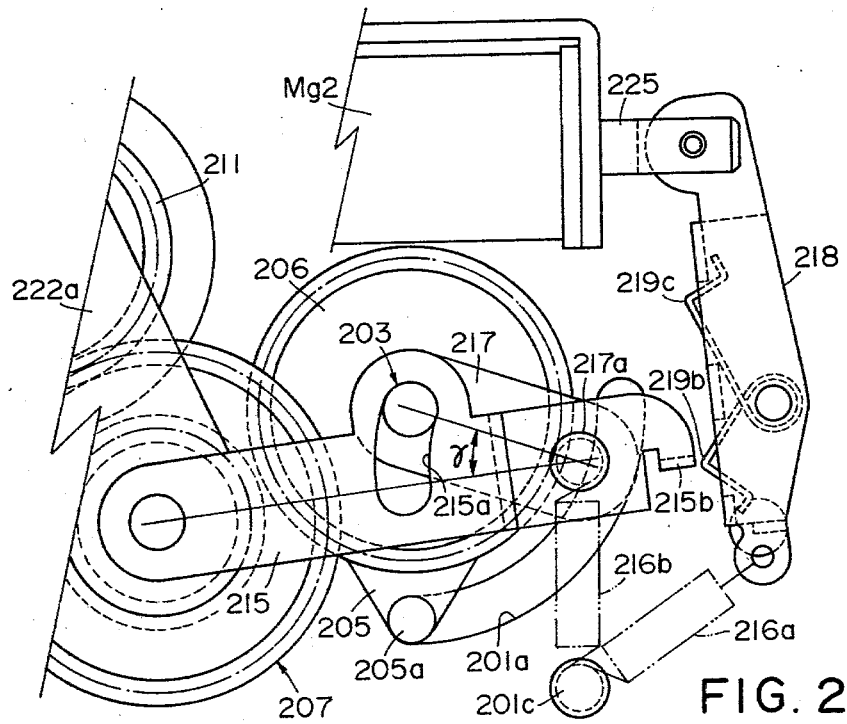
Figure 25:
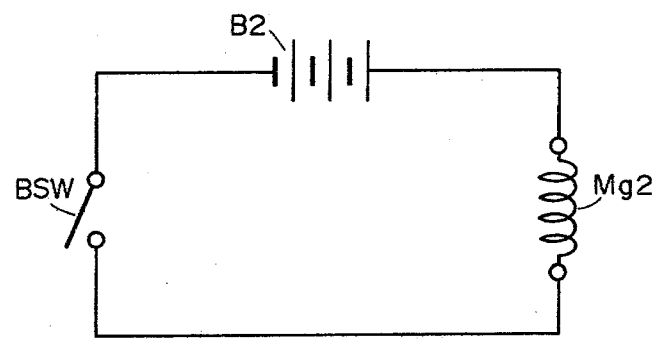
FIG. 25 is a diagram of a circuit including a solenoid assembly used in the third embodiment of FIG. 16.

Here, when the belt wearer brings the tongue of the belt system into latched condition, the buckle switch BSW shown in FIG. 25 is closed to permit power supply from a battery B2 to the solenoid assembly Mg2, which thus becomes excited. Thereupon, the plunger 225 is attracted as shown in FIG. 21 and the trigger member 218 is rotated counter-clockwise against the spring force of the coil spring 216a. By this, the downward bent portion 215b of the lever 215 and the lever hook portion 219b of the hook spring 219 are brought out of engagement. At this time, however, the draw-out of the belt has usually been completed and the belt is wound up in the take-up direction in a moment by the take-up spring, so that the disc 205, the lever 215 and the link arm 217 are not rotated counter-clockwise against the spring force of the coil spring 216b. Rather, the amount of the belt excessively drawn out is taken up by the belt wearer assuming a regular or normal attitude after the latching of the buckle and the disc 205 is rotated clockwise with the take-up shaft means 203, thereby bringing about the position of FIG. 22. In this position, the amount of the belt excessively drawn out for the wearing is taken up by the take-up spring so that the belt closely fits to the body of the belt wearer. The take-up force locking means is not yet operative.

Figure 23:
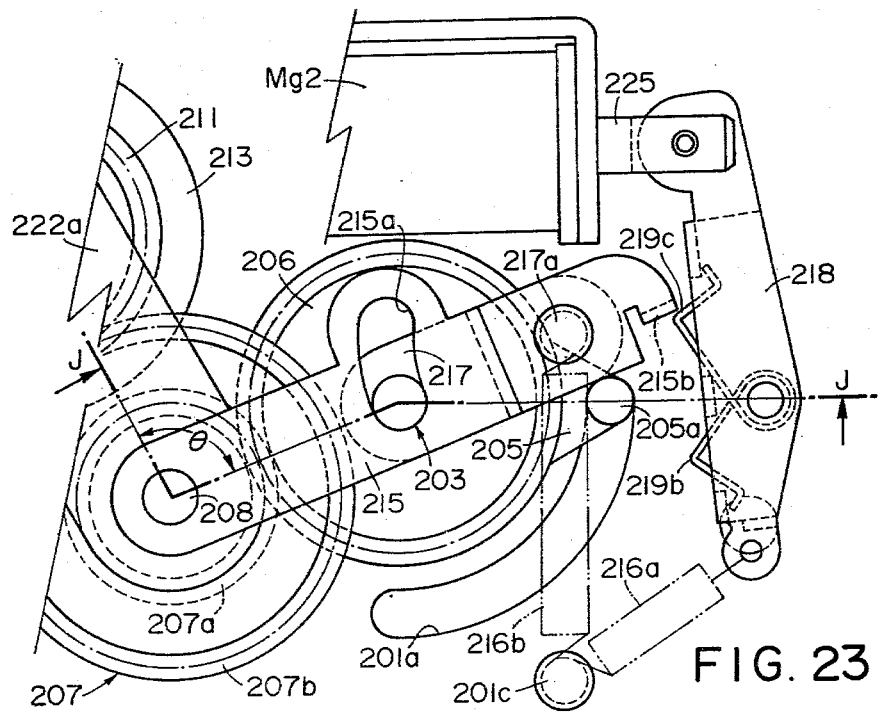

In this position, when the belt wearer manually pulls on the belt or leans forwardly, both the take-up shaft means 203 and the disc 205 are rotated counter-clockwise to draw out a predetermined amount of the belt. In this case, when the projection 205a of the disc 205 kicks the lever 215, the lever hook portion 219b of the hook spring 219 is retracted from the motion patch of the downward bent portion 215b of the lever 215 while, at the same time, the bent portion 215b begins to contact the other lever hook portion 219c of the hook spring 219 from below in FIG. 23 and further continues the pressure contact until this lever hook portion 219c is deflected toward the trigger member 218, whereby the lever 215 and the link arm 217 are rotated counterclockwisely, as viewed in FIG. 23, against the spring force of the coil spring 216b by being kicked by the projection 205a of the disc 205. At the same time therewith, the angle $\gamma$ in FIG. 22 so far formed by and between the lever 215 and the link arm 217 becomes approximately zero and therefore, the clamping plate 222a and the lever 215 are rotated counterclockwise with the shifter shaft 209, the pivot 208 and the link pin 217a as the fulcrum, thereby forming the angle $\theta$ of FIG. 23, whereupon meshing engagement is established between the main gear 206 and the pinion gear portion 207a of the idle gear 207, thus bringing about the position of FIG. 23. In the position of FIG. 23, the lever 215 is retained by the lever hook portion 219c of the hook spring 219, so that this condition is maintained until the solenoid assembly Mg2 is deenergized. That is, the lever hook portion 219c of the hook spring 219 is not deflected toward the trigger member 218 for the contact from above. Also, the setting of an optimal slackness which is created when the belt is drawn out from the condition in which it fits to the wearer, and with which the take-up force locking means is brought into its operative condition is substantially determined by an angle $\alpha$ shown in FIG. 20. That is, in the process during which the disc 205 is rotated counterclockwise from the position of FIG. 22 to bring about the position of FIG. 23, the amount of the belt drawn out by the rotation of the take-up shaft means 203 and the disc 205 substantially through the angle $\alpha$ provides the slack of the belt during the wearing thereof, and the lever 215, etc. are rotated by the rotation of the disc 205 through an angle $\beta$ shown in FIG. 20 to thereby establish meshing engagement between the main gear 206 and the idle gear 207. As a matter of course, the angle $\beta$ can be reduced by reducing the module of the main gear 206 and of the pinion gear portion 207a.

When the take-up force locking means is thus brought to its operative condition, the action of the aforementioned two cam portions 210 and 212 enables draw-out and rewind of the belt in a predetermined range with the tension lock position in which the optimal slack set by the angle $\alpha$ is present as the starting point, and the belt wearer can comfortably wear the belt and is free to lean forwardly to a suitable degree in his normal seated portion. The rotational movement of the disc 205 caused by the draw-out and take-up of the belt after the wearing of the belt is limited to the range in which the projection 205a can arcuately move reciprocally within the arcuate groove 201a, and affects the lever 215 in no way.

Next, when the belt wearer wants to return the belt to the retractor and get off the seat, the buckle may be disengaged. By this, the solenoid assembly Mg2 becomes deenergized and, when the trigger member 218 is rotated clockwise by the spring force of coil spring 216a, the engagement between the bent portion 215b of the lever 215 and the lever hook portion 219c of the hook spring 219 is released to permit the lever 215 and the link arm 217 to be rotated clockwisely by the coil spring 216b and to release the meshing engagement between the main gear 206 and the idle gear 207, thus permitting the take-up shaft means 203 to be rotated in the belt take-up direction by the force of the take-up spring to thereby take up the belt. That is, at this time, the clockwise rotation of the lever 215 brings the downward bent portion 215b of the lever 215 into contact with the lever hook portion 219b of the hook spring 219, but the lever hook portion 219b deflects toward the trigger member 218 for the pressure contact from above, so that the clockwise rotation of the lever 215 is not prevented.

The first to third embodiments permit various modifications. Firstly, such a mechanism as the embodiment in which locking means is immediately brought to its operative condition by the buckle engagement signal is also possible. Secondly, the first sensing means for sensing the wearing of the belt is not restricted to one which transmits the buckle engagement signal, but may be one which transmits the signal produced by an engine key switch or a seat switch. Thirdly, the final seated position of the belt wearer may be sensed not only by the signal produced by slight draw-out of the belt but also by means which senses, for example, the leaning of the belt wearer against the back of the seat.

What I claim is:

1. A seat belt retractor, including:

belt take-up shaft means rotatably mounted on a base member of the retractor and biased in a belt take-up direction;

belt take-up force locking means capable of assuming an interlocked position in which it is interlocked with said take-up shaft means and a non-interlocked position in which it is not interlocked with said take-up shaft means, said take-up force locking means when in said interlocked position preventing the take-up of a belt from a belt wearing position so far drawn out but permitting draw-out and take-up of the belt in a predetermined range beyond the belt wearing position so far drawn out;

first sensing means for sensing the wearing of the belt by a belt wearer; and second sensing means for sensing draw-out of the belt after the belt wearer assumes a normal seated position while wearing the belt;

said belt take-up force locking means being brought from said non-interlocked position to said interlocked position when said second sensing means senses said draw-out of the belt and after said first sensing means senses the wearing of the belt by the belt wearer.

2. The retractor according to claim 1, wherein said second sensing means includes first and second sensing members, said first sensing member sensing the belt wearer assuming a normal seated position, said second sensing member sensing the belt being somewhat drawn out, and said belt take-up force locking means being brought from said non-interlocked position to said interlocked position when said first sensing member senses the belt wearer assuming a normal seated position and said second sensing member senses belt being somewhat drawn out, in this order, after said first sensing means senses the wearing of the belt by the belt wearer.

3. The retractor according to claim 1, wherein said belt take-up force locking means includes a first rotatable member for engaging a part of said take-up shaft means when said take-up force locking means is brought to said interlocked position and being rotatable with said take-up shaft means, a first cam member rotatable with said first rotatable member, a second rotatable member in engagement with said first rotatable member and being rotatable with the first rotatable member, and a second cam member rotatable with said second rotatable member, said first and said second cam members being in a first mutually restraining position, when said take-up force locking means is brought to said interlocked position, in which said first and said second cam members abut in such a manner that said take-up shaft means is prevented from rotating in a belt take-up direction, and said first and said second cam members being in a second mutually restraining position, when the belt has been drawn out a predetermined length beyond said amount so far drawn out while said take-up force locking means is in said interlocked position, in which said first and said second cam members abut in such a manner that said take-up shaft means is prevented from rotating in a belt draw-out direction.

4. The retractor according to claim 1, wherein said second sensing means includes two arm members connected to each other at one end thereof to form a turning pair, and a disc with a projection rotatable with said take-up shaft means within a predetermined angular range, the connection of said two arm members being bent when said first sensing means senses the belt wearer is wearing the belt and after that, when the belt wearer assumes a normal seated position and the belt is subsequently somewhat drawn out, said bent connection being positioned to be kicked by said projection of said disc to straighten the connection, thereby bringing said take-up force locking means from said non-interlocked position to said interlocked position.

5. The retractor according to claim 1, wherein said second sensing means includes a toggle link mechanism capable of assuming a first position for bringing said take-up force locking means to said interlocked position and a second position for bringing said take-up force locking means to said non-interlocked position, a disc with a projection rotatable with said take-up shaft means within a predetermined angular range, said projection being capable of bringing said toggle link mechanism to said first position upon rotation of the disc, a trigger means adapted to assume, when said first sensing means does not sense the belt wearer the belt, a first control position in which it prevents said toggle link mechanism from being brought to said position from said second position by said projection of said disc and to assume, when said first sensing means senses the belt wearer wearing the belt, a second control position in which it permits said toggle link mechanism to be brought to said first position from said second position by said projection of said disc and in which it prevents said toggle link mechanism from returning from said first position to said second position.

6. The retractor according to claim 1, wherein said first sensing means includes an electrical switch, said electrical switch being closed upon wearing of the belt by the belt wearer, said second sensing means includes first and second electrical switches and a disc with a projection rotatable with said take-up shaft means within a predetermined angular range, said projection being capable of closing and opening said first and second electrical switches, and electrical means for bringing said take-up force locking means from said non-interlocked position to said interlocked position when said electrical switch of said first sensing means is closed, said first electrical switch is closed and opened, and said second electrical switch is closed by said projection of said disc upon the belt wearer assuming a normal seated position and after that the belt being somewhat drawn out, in this order.

7. A seat belt retractor, including:

belt take-up shaft means rotatably mounted on a base member of the retractor and biased in a belt take-up direction;

belt take-up force locking means capable of assuming an interlocked position in which it is interlocked with said shaft means and capable of assuming a non-interlocked position in which it is not interlocked with said shaft means, said locking means being biased to said non-interlocked position and, when in said interlocked position, preventing the take-up of a belt from a predetermined position to which the belt has been drawn out but permitting draw-out and take-up of the belt in a predetermined range beyond that position;

a movable member movable between a first position and a second position, said member being movable from the first position to the second position upon the belt being fastened around a belt wearer; and sensing means including first and second arm members pivotally connected mutually to each other at one end thereof and a disc having an engaging portion and rotatable with said take-up shaft means within a predetermined angular range, the opposite end of the first arm member being pivotally connected to said belt take-up force locking means, the opposite end of the second arm member having pivotally connected to said movable member, said two arm members being adapted to be bent at their mutual pivotal connection when said movable member moves from the first position to the second position and thereafter, when the belt is drawn out to said predetermined position from another position attained by the belt when the belt wearer is normally seated, said bent mutual pivotal connection is positioned to be engaged by said engaging portion of said disc to cause said bent connection to be straightened, such that the opposite end of said first arm member moves said take-up force locking means from said non-interlocked position to said interlocked position.

8. The retractor according to claim 7, wherein said belt take-up force locking means includes a first rotatable member for engaging said take-up shaft means and being rotatable therewith when said take-up force locking means is in said interlocked position; a first cam member rotatable with said first rotatable member; a second rotatable member engaging said first rotatable member and being rotatable with the first rotatable member; and a second cam member rotatable with said second rotatable member, said first and said second cam members being in a first mutually restraining position when said take-up force locking means assumes said interlocked position, in which restraining position said first and said second cam members abut in such a manner that said take-up shaft recess is prevented from rotating in a belt take-up direction, and said first and said second cam members are adapted to be in a second mutually restraining position when the belt is drawn out a predetermined length beyond said predetermined position while said take-up force locking means is in said interlocked position, in which second restraining position and first and said second cam members abut in such a manner that said take-up shaft means is prevented from rotating in a belt draw out direction.

* * * * *